Patented June 13, 1944

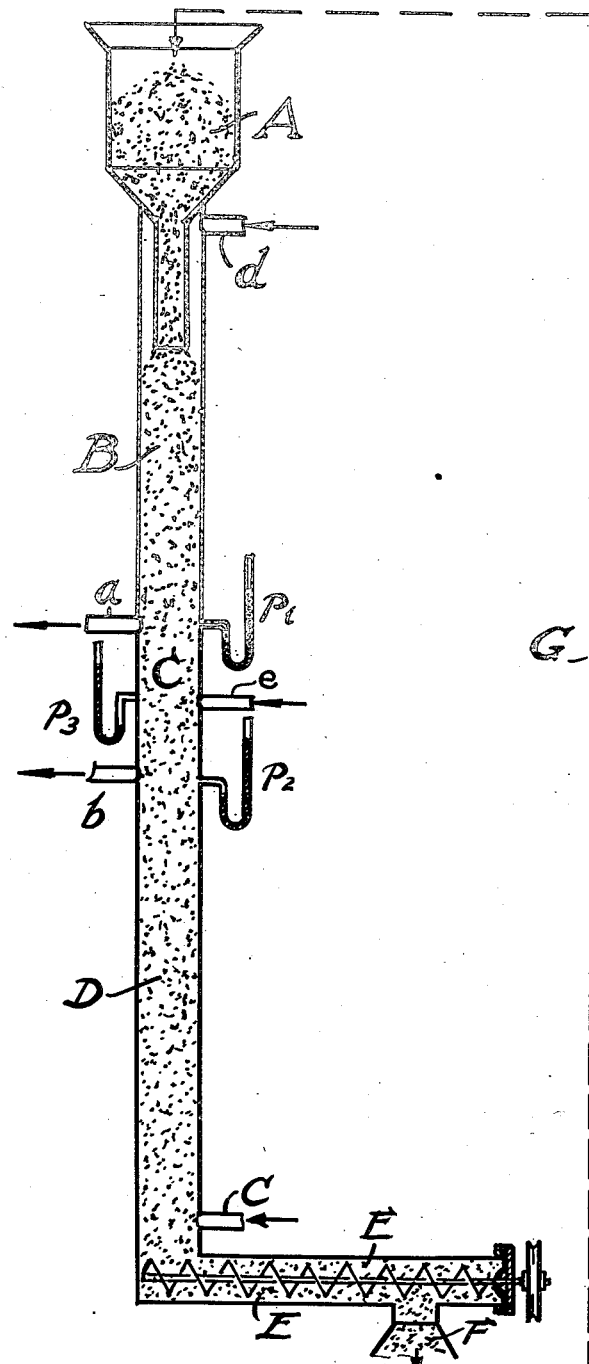

2,351,214

UNITED STATES PATENT OFFICE 2,351,214

PROCESS OF CARRYING OUT CATALYTIC GAS REACTIONS

Hermann Kaufmann and Rudolf Keinke, Leuna, Germany; vested in the Alien Property Custodian Application August 5, 1939, Serial No. 288,546
In Germany August 8, 1938

7 Claims. (Cl. 196—52)

The present invention relates to a process of carrying out catalytic gas reactions and apparatus therefor.

In many catalytic gas reactions, as for example in particular in the catalytic cracking of oil vapors, the activity of the catalysts subsides after a time to such an extent that they must be regenerated before further use. This usually effected from time to time while interrupting the operation by a treatment with air or oxygen in the reaction chamber itself at temperatures which lie about 50 to 150° C. or more above the cracking temperature when this amounts to about 450° C. The carbonaceous substances, as for example coke, which are deposited on the catalyst during the cracking reaction and which diminish the activity of the catalyst are thus burnt away. Too strong a heating in the exothermic regeneration process, however, impairs the activity of the catalyst and must therefore be avoided; the burning must therefore be carried out very carefully by appropriate dilution with inert gases, as for example nitrogen or steam, and accordingly requires usually about twice to three times as long as the cracking period.

We have now found that it is possible to carry out catalytic gas reactions, especially the cracking of hydrocarbon oils at a temperature of between 350° and 450° C., in interrupted operation without requiring the actuation of valves or the like and at the same time to maintain the activity of the catalysts throughout the whole course of the reaction by leading catalysts in the form of pieces or grains, through an elongated vessel, as for example in a cycle, in which the cracking reaction takes place in its first part and in the second part of which the regeneration of the catalyst takes place. The vessel, which may be a tube, is preferably arranged vertically, the catalyst moving downwards periodically or continuously. The speed of movement of the catalyst is determined by suitable inlet and outlet devices, as for example by moving slides, toothed wheels, conveyor worms or similar devices situated at the outlet from the vessel. It is thus possible to regulate the period during which the catalyst is in the cracking zone so that the most favorable yields are always obtained.

The length of the regeneration zone depends on the duration of the regeneration, which is usually from two to three times as long as the cracking reaction and can only be shorter when the catalyst has taken up less of the substances impairing the activity. The second part of the vessel in which the regeneration takes place may be made of a larger diameter than the cracking zone, a longer period during which the catalyst remains in the regeneration zone thus being obtained. It is preferable to lead the gas mixture containing oxygen in counter-current to the catalyst. In this way a more uniform burning of the deposited carbonaceous substances is obtained over the whole regeneration zone.

In order to keep the two treatments, cracking and regeneration, which take place in a single vessel at the same time, separate from each other, it is advantageous to form a further zone between these two zones for the two different treatments, in which further zone a sealing gas, as for example nitrogen, is led under a somewhat higher pressure than prevails at the two outlets for the reaction gases and the regeneration gases which are thus situated above and below this zone.

The process is especially suitable for the conversion of hydrocarbons of higher boiling range into non-knocking benzines and Diesel oils. In all cases, however, where gas reactions take place in the presence of catalysts and the latter retain their good activity for only a limited time and must then be regenerated, it is advantageous to work according to the said method and thus render possible a continuous operation.

The process will be further described with reference to the accompanying drawing, but the invention is not restricted to the particular apparatus shown therein.

The catalyst slides from a reservoir A into the reaction zone B in which the cracking takes place, and thence through the sealing zone C into the regeneration zone D. The speed of movement of the catalyst is determined by a conveyor device, for example the conveyor worm E which leads the catalyst into a chamber from which it may be moved by known means back into the reservoir A. The gases to be treated, as for example oil vapors, enter the cracking zone B at $d$ and leave it at $a$. The regeneration gas enters the regeneration zone D at $c$ and leaves it at $b$. The sealing gas, as for example nitrogen, enters the sealing zone at $e$ under a somewhat higher pressure than at $a$ and $b$; by reason of its higher pressure it flows towards both outlets $a$ and $b$. It thus prevents passage of the regenerating gas into the reaction gas and vice versa. In order to keep the amount of sealing gas as low as possible, the pressure of the reaction gas at $a$ is preferably kept at the same value as that of the regenerating gas at $b$ by an automatic pressure regulation. In order to reduce the amount of sealing gas to the greatest possible extent, the sealing zone C is preferably not made too short. A longer sealing zone also takes up any gas impulses that may occur and prevents any mixing of the reaction and regeneration gases. The vaporous reaction products leaving at $a$ are separated into liquid and gas by cooling. The whole reaction chamber is kept at the necessary temperature by an electrical heating jacket or by gas heating.

The following example will further illustrate the nature of this invention but the invention is not restricted to this example.

Example

The apparatus used is a vertical, electrically heated iron tube constructed according to the accompanying drawing. 20 liters of catalyst in the form of pieces are present therein; the catalyst consists of magnesium silicate and is arranged so that 6 liters are in the reservoir A, 4 liters in the cracking zone B, 2 liters in the sealing zone C and 8 liters in the regeneration zone D. The conveyor worm E withdraws 8 liters of catalyst per hour from the tube at F in a regenerated state. An equal amount slides continuously down from the reservoir A. 4 liters per hour of a Persian gas oil having a boiling range of 225° to 350° C. and a specific gravity of 0.835 are heated to 465° C. in a gas-heated preheating coil and led into the top of the tube at $d$. At the bottom of the tube there are introduced per hour 12 cubic meters of a mixture of equal volumes of air and nitrogen, preferably preheated to 440° C. Into the central sealing zone, 1.5 cubic meters of nitrogen per hour are led in. At the points at which the pressures are measured, the following pressures (millimeters of water) are indicated: $p_1=125$, $p_2=125$, $p_3=200$. The mean cracking temperature is 450° C., and the highest temperature measured in the catalyst in the zone D is 560° C.

The reaction products leaving at $a$ are cooled to 0° C. and then to 40° below zero C. There are thus obtained per hour 2.95 kilograms of liquid product, 0.10 kilogram of gas benzine and 120 liters of gas.

The 2.95 kilograms of liquid product and the 0.10 kilogram of gas benzine yield after distillation and stabilization:

| | Kilograms |
|---|---|
| Benzine having an octane number 90 | 1.340 |
| Residual oil having a cetene number 56 | 1.580 |
| Gas benzine (in particular $C_4$-hydrocarbons) | 0.130 |

The escaping gas contains about half of the "sealing nitrogen" and 0.10 kilogram of $C_1$-$C_3$-hydrocarbons and hydrogen in the ratio of 2:1.

The gas leaving at $b$ contains 0.29 kilogram of carbon dioxide which has been formed by burning the deposits on the catalyst.

What we claim is:

1. A process of carrying out the catalytic cracking of hydrocarbon oil vapors at a temperature of from 350° to 650° C. while using a catalyst in piece form, which must from time to time be regenerated, which comprises passing the catalyst in a cycle through an elongated vessel in the first part of which the reaction and in the second and longer part of which the regeneration of the catalyst is carried out by means of gas containing oxygen, passing said hydrocarbon oil vapors concurrently with said catalyst through said first part and passing said gas containing oxygen countercurrently to said catalyst through said second section, separately withdrawing gaseous products from each of said sections at spaced points therebetween and passing an inert gas across said elongated vessel in the zone between said spaced points of withdrawal of gaseous reaction products to maintain therebetween a zone of higher pressure than that prevailing at both the points of withdrawal of said gaseous products.

2. In the process of carrying out catalytic gas reactions at a high temperature during which the activity of the catalyst decreases to such an extent that it must be regenerated and in which the catalyst is moved successively through a zone in which the desired gas reaction and through another zone in which the regeneration of the catalyst take place simultaneously, the improvement which comprises carrying out said gas reaction and said regeneration in respective zones of a single reaction vessel, maintaining an open valveless connection between said zones, thus permitting an unobstructed coherent flow of the catalyst through the entire reaction vessel while preventing intermingling of the reactants present in said zones by introducing therebetween an inert gas having a higher pressure than that prevailing in either of said two zones.

3. In the process of carrying out catalytic gas reactions at a high temperature during which the activity of the catalyst decreases to such an extent that it must be regenerated and in which the catalyst is moved successively through a zone in which the desired gas reaction and through another zone in which the regeneration of the catalyst with the aid of oxidizing gases take place simultaneously, the improvement which comprises carrying out said gas reaction and said regeneration in respective zones of a single reaction vessel, maintaining an open valveless connection between said zones, thus permitting an unobstructed coherent flow of the catalyst through the entire reaction vessel, preventing intermingling of the reactants present in said zones by introducing therebetween an inert gas having a higher pressure than that prevailing in either of said two zones and withdrawing the reaction products from said zones separately at spaced points located in adjacent portions of said zones.

4. In the process of carrying out catalytic gas reactions at a high temperature during which the activity of the catalyst decreases to such an extent that it must be regenerated and in which the catalyst is moved through a first zone in which the desired gas reaction and through a second zone in which the regeneation with the aid of an oxidizing gas are carried out simultaneously, the improvement which comprises carrying out said gas reaction and said regeneration in successive zones of a single elongated reaction vessel, maintaining an open valveless connection between said zones, thus permitting an unobstructed coherent flow of the catalyst through the entire length of said elongated reaction vessel, separately admitting to said elongated reaction vessel the gases used in said gas reaction and said regeneration, respectively, into opposite portions along said elongated reaction vessel, separately withdrawing the gaseous products formed in said first and second zones at spaced points therebetween and introducing an inert gas at a point located between said spaced points of withdrawal, the pressure of said inert gas being higher than that prevailing at both the points of withdrawal of said gaseous products.

5. The process as claimed in claim 4 in which the inert gas is passed from its feed point across the width of said elongated reaction vessel to said points of withdrawal and withdrawn together with said gaseous products.

6. A process of carrying out the catalytic cracking of hydrocarbon oil vapors at a temperature of from 350° to 650° C. while using a catalyst in piece form, which must from time to time be regenerated, which comprises passing the catalyst in a cycle through an elongated vessel in the first part of which the reaction and in the second and longer part of which the regeneration of the catalyst is carried out by means of gas-containing oxygen, separately admitting to said elongated vessel, the gases used in said reaction and said regeneration, respectively, into opposite portions along said elongated vessel, separately withdrawing the gaseous products formed in said first and second parts at spaced points therebetween, and preventing intermingling of the products of reaction and regeneration solely by introducing an inert gas into the zone between said spaced points of withdrawal of gaseous reaction products at a pressure greater than that prevailing at both points of withdrawal of said gaseous products.

7. A process of carrying out the catalytic cracking of hydrocarbon oil vapors at a temperature from 350° to 650° C. while using a catalyst in piece form, which must from time to time be regenerated, which comprises passing the catalyst through an elongated vessel in the first part of which the reaction and in the second and more spacious part of which the regeneration of the catalyst is carried out by means of a gas containing oxygen, separately admitting to said elongated vessel the gases used in said reaction and said regeneration, respectively, into opposite portions along said elongated vessel, separately withdrawing the gaseous products formed in said first and second parts at spaced points therebetween and preventing intermingling of the products of reaction and regeneration solely by introducing an inert gas into the zone between said spaced points of withdrawal of gaseous reaction products at a pressure greater than that prevailing at both points of withdrawal of said gaseous products.

HERMANN KAUFMANN.
RUDOLF KEINKE.